(12) United States Patent
Chen et al.

(10) Patent No.: US 11,664,738 B2
(45) Date of Patent: May 30, 2023

(54) CONTROL CHIP AND SWITCHING POWER SUPPLY

(71) Applicant: Silergy Semiconductor Technology (Hangzhou) LTD, Hangzhou (CN)

(72) Inventors: Zhan Chen, Hangzhou (CN); Jian Deng, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/402,847

(22) Filed: Aug. 16, 2021

(65) Prior Publication Data
US 2022/0069729 A1   Mar. 3, 2022

(30) Foreign Application Priority Data
Sep. 1, 2020   (CN) .......................... 202010903003.1

(51) Int. Cl.
| | |
|---|---|
| *H02M 1/32* | (2007.01) |
| *H02M 7/02* | (2006.01) |
| *H02M 7/06* | (2006.01) |
| *H02M 1/44* | (2007.01) |
| *H02M 1/00* | (2006.01) |

(52) U.S. Cl.
CPC .............. *H02M 7/06* (2013.01); *H02M 1/322* (2021.05); *H02M 1/0006* (2021.05); *H02M 1/44* (2013.01)

(58) Field of Classification Search
CPC .... H02M 1/0006; H02M 1/0012; H02M 1/32; H02M 1/322; H02M 1/44; H02M 7/02; H02M 7/06; H02M 7/12; H02M 7/155; H02M 7/1555; H02M 7/162; H02M 7/217; H02M 5/40; H02M 5/42; H02M 5/44; H02M 5/45; H02M 5/4505
See application file for complete search history.

(56) References Cited

U.S. PATENT DOCUMENTS

| | | |
|---|---|---|
| 7,227,277 B2 | 6/2007 | Chapman et al. |
| 7,256,568 B2 | 8/2007 | Lam et al. |
| 8,310,846 B2 | 11/2012 | Piazzesi |
| 8,853,888 B2 | 10/2014 | Khaligh |
| 9,130,460 B2 | 9/2015 | Sun et al. |

(Continued)

FOREIGN PATENT DOCUMENTS

CN    109901474 A  *  6/2019

*Primary Examiner* — Thienvu V Tran
*Assistant Examiner* — Shahzeb K Ahmad

(57) ABSTRACT

A control chip applied in a switching power supply, where the switching power supply includes a rectifier circuit for receiving an AC input voltage and generating a rectified voltage, the control chip including: a high-voltage pin; a detection circuit coupled to the high-voltage pin to determine whether the high-voltage pin is coupled to the AC input voltage or the rectified voltage according to a sampling voltage representing a voltage received by the high-voltage pin; and a discharge circuit, where when the high-voltage pin is determined to be coupled to the AC input voltage, the control chip can enable the discharge circuit to discharge a safety capacitor coupled to an input port of the switching power supply after the switching power supply is powered off, and when the high-voltage pin is determined to be coupled to the rectified voltage, the control chip can disable the discharge circuit.

20 Claims, 13 Drawing Sheets

(56) References Cited

U.S. PATENT DOCUMENTS

| | | |
|---|---|---|
| 9,257,916 B2 | 2/2016 | Cheng et al. |
| 9,543,822 B2 | 1/2017 | Hang et al. |
| 9,559,591 B2 | 1/2017 | Hang et al. |
| 2007/0052397 A1 | 3/2007 | Thompson et al. |
| 2008/0231115 A1 | 9/2008 | Cho et al. |
| 2008/0258688 A1 | 10/2008 | Hussain et al. |
| 2012/0153729 A1 | 6/2012 | Song et al. |
| 2013/0049706 A1* | 2/2013 | Huang ............... H02M 1/32 |
| | | 320/166 |
| 2013/0063180 A1 | 3/2013 | Sun et al. |
| 2013/0076315 A1* | 3/2013 | Liu .................... H02M 1/32 |
| | | 320/166 |
| 2013/0335038 A1* | 12/2013 | Lee .................. H02M 1/126 |
| | | 320/166 |
| 2014/0184145 A1* | 7/2014 | Degen ................. H03K 5/14 |
| | | 327/261 |
| 2015/0062974 A1* | 3/2015 | Lund ............. H02M 3/33546 |
| | | 363/21.04 |
| 2015/0078045 A1 | 3/2015 | Zhang et al. |
| 2015/0288286 A1* | 10/2015 | Chu .............. H02M 3/33507 |
| | | 363/21.12 |
| 2016/0211745 A1 | 7/2016 | Hang et al. |
| 2016/0226371 A1* | 8/2016 | Tsou .................... H02M 1/32 |
| 2017/0063238 A1 | 3/2017 | Hang et al. |
| 2017/0279279 A1 | 9/2017 | Shimada et al. |
| 2018/0198361 A1 | 7/2018 | Seong et al. |
| 2021/0036541 A1* | 2/2021 | Chen ................... H02J 7/0047 |

\* cited by examiner

CONTROL CHIP AND SWITCHING POWER SUPPLY

RELATED APPLICATIONS

This application claims the benefit of Chinese Patent Application No. 2020109030011, filed on Sep. 1, 2020, which is incorporated herein by reference in its entirety.

FIELD OF THE INVENTION

The present invention generally relates to the field of power electronics, and more particularly to control circuits and associated switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching power supply may receive an AC input voltage from the AC input port, and can convert it into a fixed output signal or an adjustable output signal through different forms of circuit architectures, in order to provide the output signal to computers, automated office equipment and other electronic products. Typically, the switching power supply can include a control chip and a power stage circuit. The control chip can include multiple pins to receive or output signals. For example, the control chip can include a high-voltage pin for receiving the rectified voltage on the AC input voltage to provide the operating current required by the control chip when the switching power supply is started, and to ensure that the switching power supply can be started normally.

In order to filter the electromagnetic interference (EMI) noise in the AC input voltage, a safety capacitor of X-type may also be in parallel with two terminals of the AC input port of the traditional switching power supply. Based on the characteristics of the capacitor, a resistor may be needed to be set in parallel with the safety capacitor. When the switching power supply is powered off, the safety capacitor can release the stored electric energy through the resistor to avoid the risk of electric shock for the user. However, in order to meet different application requirements, the high-voltage pins of the control chip have different connection ways. Typically, the switching power supply may be equipped with multiple control chips to meet the needs of different applications. However, setting multiple control chips can increase management costs in the production and delivery cycle of the switching power supply, and is generally not conducive to system integration. In addition, discharging the energy in the safety capacitor through the resistor can increase the power consumption, particularly the no-load power consumption, of the switching power supply.

Figure 1:
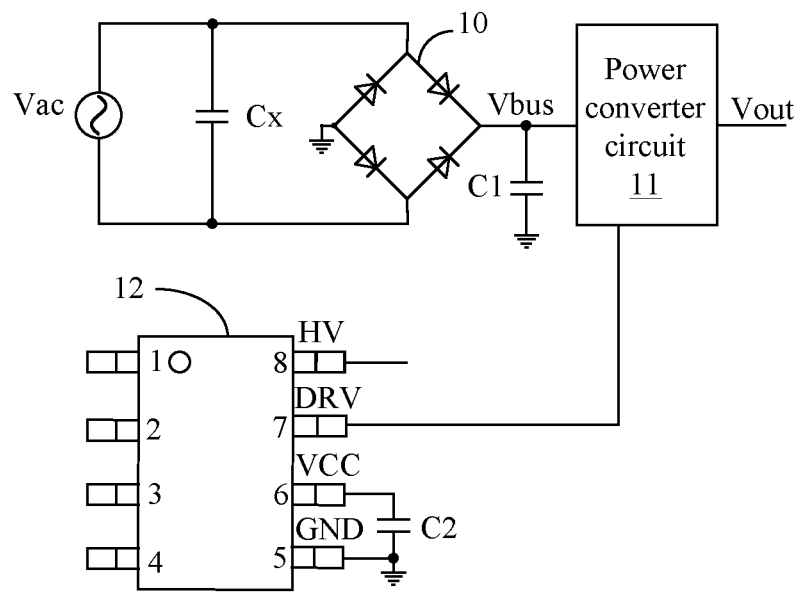
FIG. 1 is a schematic diagram of a first example switching power supply, in accordance with embodiments of the present invention.

Referring now to FIG. 1, shown is a schematic diagram of a first example switching power supply, in accordance with embodiments of the present invention. In this particular example, the switching power supply is an AC/DC switching power supply, which can include safety capacitor Cx, rectifier circuit 10, filter capacitor C1, power conversion circuit 11, and control chip 12. Rectifier circuit 10 may receive AC input voltage Vac via the AC input port, and can rectify AC input voltage Vac to generate rectified voltage Vbus at the output terminal of rectifier circuit 10. Filter capacitor C1 can filter rectified voltage Vbus. Power conversion circuit 11 may receive rectified voltage Vbus, and converts it into output voltage Vout of the switching power supply for the load. Further, safety capacitor Cx can connect between the two terminals of the AC input port to filter out possible noise in AC input voltage Vac. In this example, power conversion circuit 11 can be a flyback converter, a boost converter or any other suitable type of converter.

Control chip 12 can include a plurality of pins to receive or output signals, such as power pin VCC, ground pin GND, output pin DRV, and high-voltage pin HV. Here, control chip 12 can receive the required operation voltage through power pin VCC, and power pin VCC can be coupled to ground pin GND through bypass capacitor C2, such that control chip 12 can operate normally. Also, control chip 12 may receive an input voltage related to AC input voltage Vac through high-voltage pin HV to provide the required operation current when the switching power supply is started, and to ensure that the switching power supply can be started normally. When the switching power supply is started, control chip 12 provides a charging current through high-voltage pin HV to charge bypass capacitor C2, and the voltage on power supply pin VCC rises rapidly. When the voltage on power supply pin VCC is higher than the startup voltage of the switching power supply, control chip 12 can effectively disconnect high-voltage pin HV, and then no power consumption is generated. Therefore, a fast startup can be achieved and standby power consumption can be actively reduced. Also, control chip 12 can generate a driving signal through output pin DRV to control the switching states of power switches in power conversion circuit 11, such that power conversion circuit 11 can generate output voltage Vout.

In this example, high-voltage pin HV of control chip 12 can connect to the input side of the switching power supply in various ways. For example, high-voltage pin HV can be connected to the input port of rectifier circuit 10 to receive AC input voltage Vac, or may be connected to the output port of rectifier circuit 10 to receive rectified voltage Vbus. Control chip 12 may provide a pull-down current to high-voltage pin HV during a detection period, in order to avoid signal interference when detecting the input voltage on high-voltage pin HV, thereby improving the detection accuracy. During the detection period, control chip 12 can determine the connection way between high-voltage pin HV and the input side of the switching power supply according to the input voltage on high-voltage pin HV and a reference voltage, and may generate the detection signal. Then, control chip 12 can control the discharge of safety capacitor Cx according to the detection signal. In this example, the detection period can be a predetermined time period from the start-up moment of the switching power supply, and the predetermined time period can include at least half of a power frequency period, in order to avoid an incorrect determination of the connection way of high-voltage pin HV.

Figure 2:
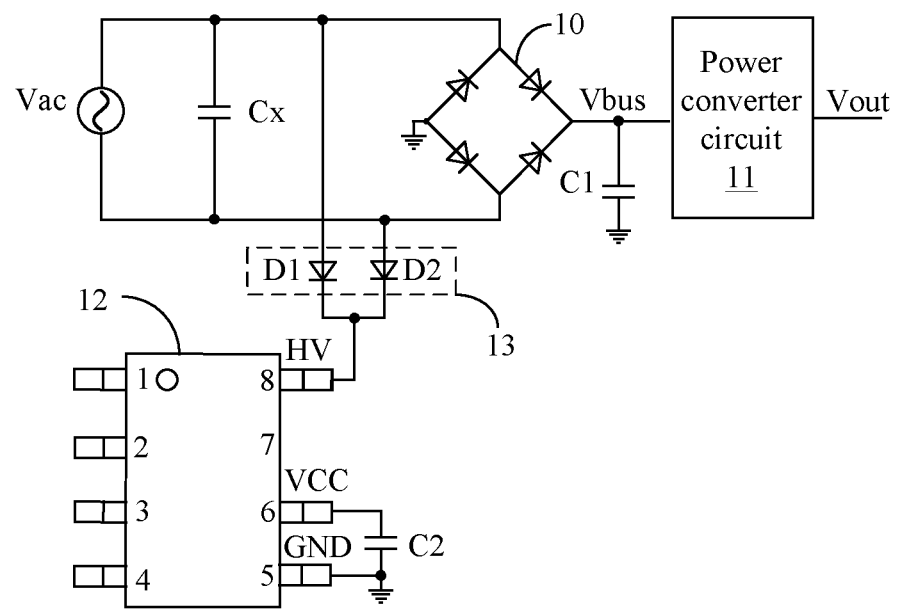
FIG. 2 is a schematic diagram of a second example switching power supply, in accordance with embodiments of the present invention.
Figure 3:
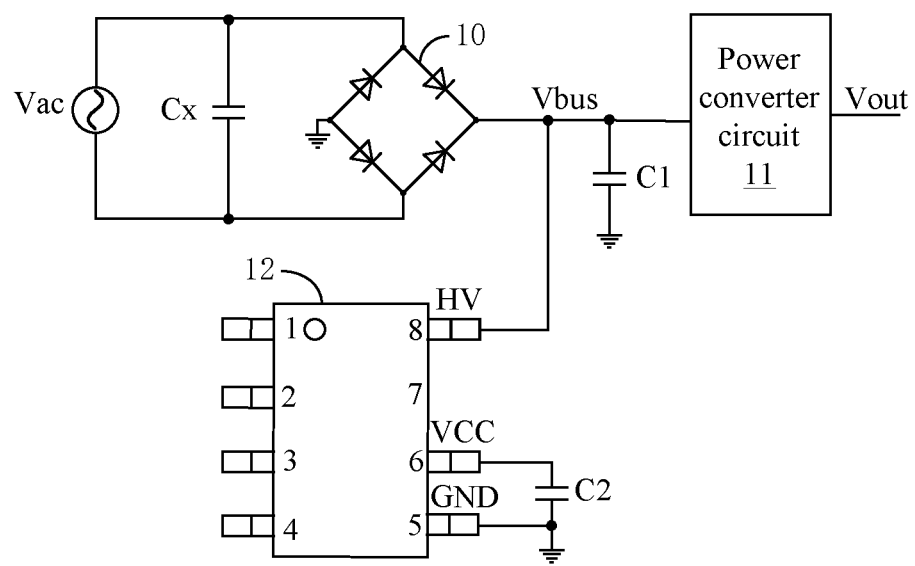
FIG. 3 is a schematic diagram of a third example switching power supply, in accordance with embodiments of the present invention.

In order to meet different application requirements, the control chip can be compatible with multiple connection ways between the high-voltage pin and the input side of the switching power supply, in order to reduce the number of control chips and save associated management costs. FIGS. 2 and 3 respectively show exemplary different connection ways between the high-voltage pin HV of the control chip and the input side of the switching power supply.

Referring now to FIG. 2, shown is a schematic diagram of a second example switching power supply, in accordance with embodiments of the present invention. In this particular example, high-voltage pin HV of control chip 12 can be coupled to the input port of rectifier circuit 10. For example, high-voltage pin HV can respectively be coupled with two terminals of safety capacitor Cx through rectifier circuit 13 to receive AC input voltage Vac. In this example, rectifier circuit 13 can include diodes D1 and D2, and anodes of diodes D1 and D2 may respectively connect to the two terminals of the AC input port to receive AC input voltage Vac, and cathodes of diodes D1 and D2 can connect together to high-voltage pin HV. In this example, the input voltage at high-voltage pin may essentially be an absolute value of AC input voltage Vac.

Referring now to FIG. 3, shown is a schematic diagram of a third example switching power supply, in accordance with embodiments of the present invention. In this particular example, high-voltage pin HV of control chip 12 can be coupled to the output port of rectifier circuit 10. In this example, high-voltage pin HV may directly receive rectified voltage Vbus generated by rectifier circuit 10. It should be noted that rectified voltage Vbus has relatively small fluctuations. Since high-voltage pin HV is directly connected to the high potential terminal of the output port of rectifier circuit 10 in this example, there may be no need to use two high voltage diodes. Thus, as compared with the connection way of high-voltage pin HV shown in FIG. 2, the connection way of high-voltage pin HV in this example can reduce the associated costs.

In this example, the control chip can detect the connection way between the high-voltage pin and the input side of the switching power supply according to the input voltage on high-voltage pin HV. When the detection signal is active, high-voltage pin HV may be determined to be coupled to the input port of rectifier circuit 10 through rectifier circuit 13 to receive AC input voltage Vac, as shown in FIG. 2. In this way, when the switching power supply is powered off, control chip 12 can provide a discharge current to high-voltage pin HV, and may directly discharge safety capacitor Cx until the voltage across safety capacitor Cx drops below the safe value, such that the power consumption generated by discharging with a resistor can essentially be eliminated, and thus the standby power consumption can be actively reduced.

When the detection signal is inactive, high-voltage pin HV may be determined to be directly connected to the output port of rectifier circuit 10 to receive rectified voltage Vbus, as shown in FIG. 3. Since filter capacitor C1 can connect to the output port of rectifier circuit 10 for maintaining rectified voltage Vbus, high-voltage pin HV of control chip 12 may not provide a discharge current to discharge safety capacitor Cx, such that control chip 12 may be prohibited from discharging safety capacitor Cx. When control chip 12 detects that the switching power supply is powered off, safety capacitor Cx can be discharged through a special discharge circuit, in order to avoid the risk of electric shock for the user.

As described above, only one control chip may be provided in the embodiments of the present invention, and the function of discharging of the safety capacitor can be adjusted adaptively by detecting the connection way between the high-voltage pin and the input side of the switching power supply, such that the control chip is compatible with multiple devices at the same time, thereby saving the number of control chips, saving management costs, and facilitating system integration. In addition, the control chip can discharge the safety capacitor when the switching power supply is powered off, thus reducing the power consumption of the switching power supply.

Figure 4:
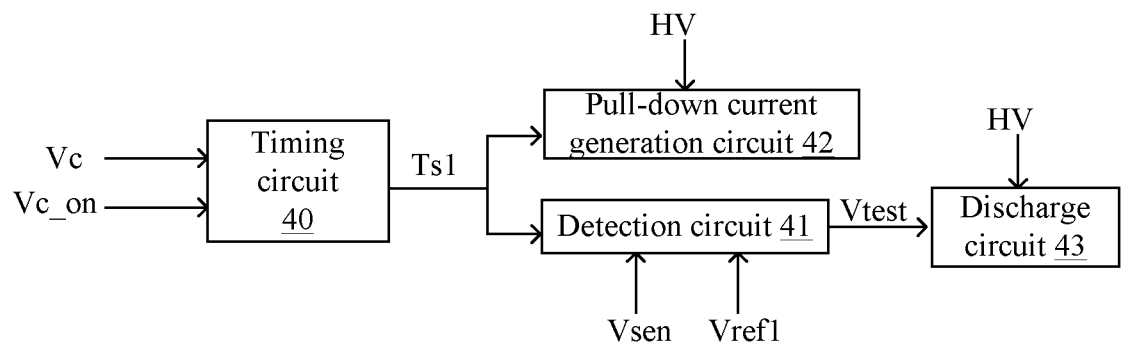
FIG. 4 is a schematic block diagram of a first example control chip, in accordance with embodiments of the present invention.

Referring now to FIG. 4, shown is a schematic block diagram of a first example control chip, in accordance with embodiments of the present invention. In this example, the control chip can include timing circuit 40 and detection circuit 41. Timing circuit 40 may receive power supply voltage Vc from power supply pin VCC, and can compare power supply voltage Vc against power supply reference voltage Vc_on to determine the start-up moment of the switching power supply. In this example, timing circuit 40 may start timing from the start-up moment and can generate a timing signal Ts1 that characterizes the detection period. Detection circuit 41 may receive sampling voltage Vsen that characterizes the input voltage on high-voltage pin HV and reference voltage Vref1, in order to generate an intermediate signal. When the timing time of timing circuit 40 reaches a timing reference signal, detection signal Vtest can be generated according to timing signal Ts1 and the intermediate signal, in order to determine whether high-voltage pin HV is coupled to AC input voltage Vac or rectified voltage Vbus.

The control chip can also include pull-down current generation circuit 42, which can be coupled to high-voltage pin HV, and may provide a pull-down current to high-voltage pin HV during the active period of timing signal Ts1. For example, the pull-down current generated by pull-down current generation circuit 42 may flow through the current path from high-voltage pin HV to the ground, or the current path from power supply pin VCC to high-voltage pin HV, in order to provide the pull-down current for high-voltage pin HV.

The control chip can also include discharge circuit 43, which can be coupled to high-voltage pin HV, and may adjust the function of discharging safety capacitor Cx according to detection signal Vtest. When detection signal Vtest is inactive, high-voltage pin HV can be determined to be directly connected to rectified voltage Vbus, and thus discharge circuit 43 may be prohibited from discharging safety capacitor Cx. When detection signal is active, high-voltage pin HV can be determined to be coupled to AC input voltage Vac through rectifier circuit 13, and thus discharge circuit 43 may be controlled by detection signal Vtest to discharge safety capacitor Cx when the switching power supply is powered off.

Figure 5:
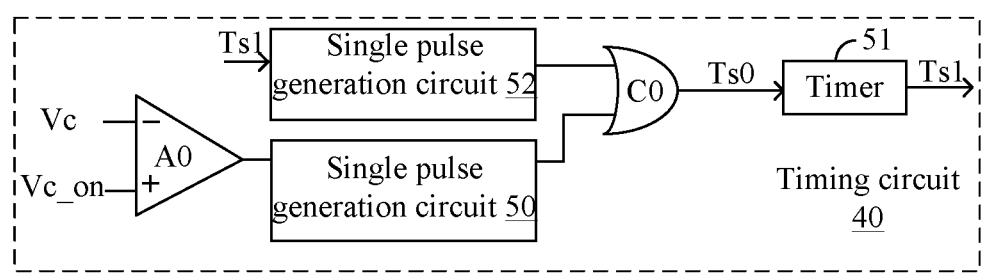
FIG. 5 is a schematic block diagram of an example timing circuit, in accordance with embodiments of the present invention.

Referring now to FIG. 5, shown is a schematic block diagram of an example timing circuit, in accordance with embodiments of the present invention. In this particular example, timing circuit 40 can include comparator A0, single pulse generation circuit 50, and timer 51. A non-inverting input terminal of comparator A0 may receive power supply reference voltage Vc_on, and an inverting input terminal may receive power supply voltage Vc from power supply pin VCC. The start-up moment of the switching power supply can be determined by comparing power supply reference voltage Vc_on against power supply voltage Vc. Single pulse generation circuit 50 can connect to an output terminal of comparator A0, and may generate pulse signal Ts0 with a predetermined pulse width when the switching power supply is started (e.g., when power supply voltage Vc is greater than power supply reference voltage Vc_on). Then, timer 51 may receive pulse signal Ts0 and starts timing to generate timing signal Ts1.

In one example, detection circuit 41 can detect the voltage from high-voltage pin HV only once during the detection period (e.g., during the active period of timing signal Ts1), and can save the detection result until the switching power supply is restarted again. However, since high-voltage pin HV of the control chip can be important for the switching power supply to realize fast startup, the determination condition of the connection way of high-voltage pin HV can be relatively strict. If an error occurs in the determination, the control chip can be overheated and damaged. In another example, detection circuit 41 may repeatedly detect the connection way of high-voltage pin HV by resetting the detection period, in order to improve the determination accuracy. For example, timing circuit 40 can include single pulse generation circuit 52 and OR-gate C1. When the timing time reaches the timing reference signal, single pulse generation circuit 52 may generate a pulse signal with a predetermined pulse width. Since OR-gate C0 may receive the pulse signals generated by single pulse generation circuits 50 and 52, OR-gate C0 can generate active pulse signal Ts0 when at least one of the two pulse signals is active. After the detection period ends, timing circuit 40 can perform a self-reset according to timing signal Ts1, and restarts timing to start a new detection period. Then, detection circuit 41 can re-detect the connection way of high-voltage pin HV in the new detection period.

In order to save the detection time, the timing time of timing circuit 40 may not be reset, and the repeated detection can be realized by dividing the detection period into several detection intervals. In one example, the detection period is divided into N detection intervals, and detection circuit 41 can determine whether high-voltage pin HV is coupled to the AC input voltage or the rectified voltage in each detection interval, in order to generate a determination result. Here, N is a positive integer. When the times of the determination result is accumulated to a preset number of times, detection signal Vtest may be generated. In this way, the detection accuracy can be improved. After the detection period ends, the detection circuit may save the detection result until the switching power supply restarts again.

Figure 6:
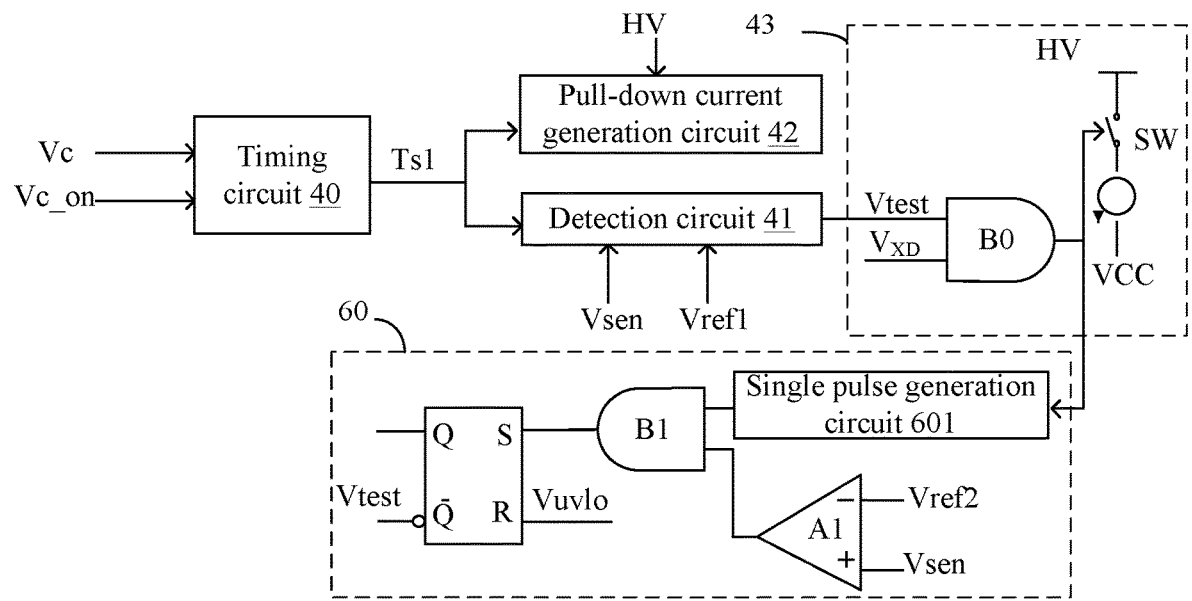
FIG. 6 is a schematic block diagram of a second example control chip, in accordance with embodiments of the present invention.

Referring now to FIG. 6, shown is a schematic block diagram of a second example control chip, in accordance with embodiments of the present invention. In this particular example, the control chip can include timing circuit 40, detection circuit 41, pull-down current generation circuit 42, and discharge circuit 43. Discharge circuit 43 can detect the power-off moment of the switching power supply when detection signal Vtest is active, and may generate discharge control signal VXD. For example, discharge circuit 43 can include AND-gate B0 and a discharge path coupled between high-voltage pin HV and power supply pin VCC. When detection signal Vtest and discharge control signal VXD are both active, AND-gate B0 may generate an active control signal to control switch SW, such that the discharge path conducts. In this example, power supply pin VCC can be coupled to ground pin GND through bypass capacitor C2. For example, the discharge path can include a controllable load or a controllable current source to provide a discharge current to high-voltage pin HV.

As mentioned above, the switching power supply may have relatively strict determination conditions for the connection way of high-voltage pin HV. In order to ensure that the control chip can operate normally, the control chip can also include error correction circuit 60 to correct the determination result in the case of a misjudgment, in order to ensure the normal operation of the switching power supply. For example, error correction circuit 60 can include single pulse generation circuit 601, comparator A1, and a logic circuit. Single pulse generation circuit 601 may receive the signal generated by AND-gate B0 to generate a pulse signal with a predetermined pulse width after the discharge path conducts for a predetermined time. An inverting input terminal of comparator A1 may receive reference voltage Vref2, and a non-inverting input terminal may receive sampling voltage Vsen. In this example, the logic circuit can include AND-gate B1 and an RS flip-flop. AND-gate B1 may receive output signals generated by comparator A1 and single pulse generation circuit 601. Also, set terminal S of the RS flip-flop can connect to the output terminal of AND-gate B1, and reset terminal R may receive restart signal Vuvlo representing the restart moment of the switching power supply, in order to generate detection signal Vtest.

For example, when it is determined that high-voltage pin HV is coupled to AC input voltage Vac, detection signal Vtest can be active, and thus discharge circuit 43 can provide the discharge current to safety capacitor Cx when discharge control signal VXD is active. After the predetermined time, single pulse generation circuit 601 may generate an active pulse signal. Also, when sampling voltage Vsen is greater than reference voltage Vref2, comparator A1 may generate a high level signal, and thus AND-gate B1 can generate a high level signal, such that the RS flip-flop generates an inactive detection signal Vtest, which may indicate that a misjudgment occurred, and then can update detection signal Vtest. When sampling voltage Vsen is not greater than reference voltage Vref2 after the predetermined time, comparator A1 may generate a low level signal, and thus the RS flip-flop can generate active detection signal Vtest, which may indicate that the determination is correct. In this example, the predetermined time may not be less than the discharge time of the safety capacitor to ensure that the voltage on high-voltage pin HV is fully discharged before detecting whether a misjudgment occurs. When restart signal Vuvlo is active, error correction circuit 60 may no longer save detection signal Vtest, and can perform the detection again.

Figure 7:
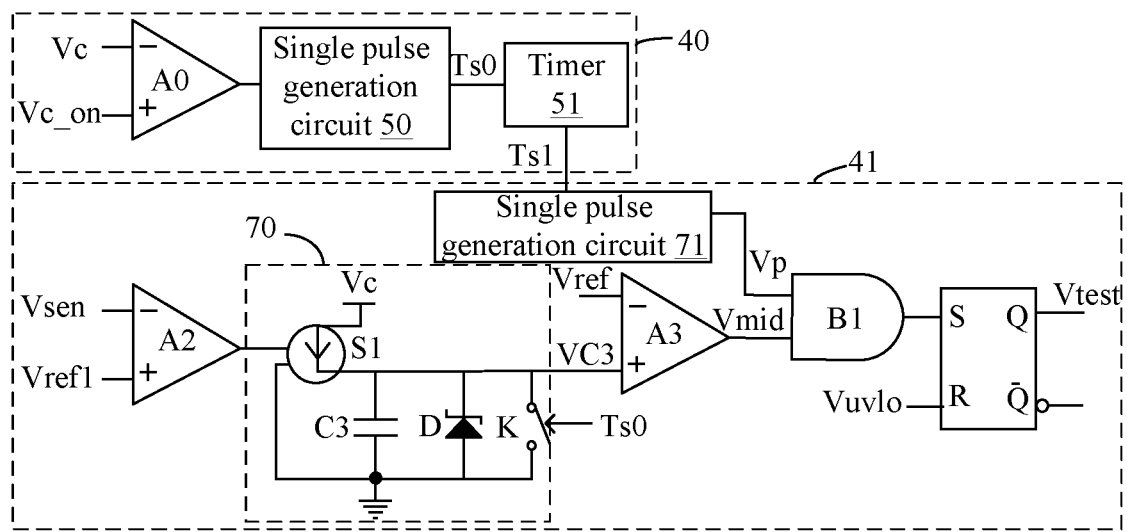
FIG. 7 is a schematic block diagram of a third example control chip, in accordance with embodiments of the present invention.

Referring to FIG. 7, shown is a schematic block diagram of a third example control chip, in accordance with embodiments of the present invention. To simplify the description, only one detection period is set by timing circuit 40 for example. It should be understood that the timing circuit described in FIG. 5 can set multiple detection periods to control the detection circuit to repeatedly detect the voltage on high-voltage pin HV. In this example, timing circuit 40 can include comparator A0, single pulse generation circuit 50, and timer 51, and the operating principle is substantially the same as that of FIG. 5.

In this example, detection circuit 41 can include comparator A2, voltage generation circuit 70, comparator A3, and a logic circuit. An inverting input terminal of comparator A2 may receive sampling voltage Vsen representing the input voltage on high-voltage pin HV, a non-inverting input terminal may receive reference voltage Vref1, and comparator A2 may generate a comparison signal by comparing sampling voltage Vsen against reference voltage Vref1 to determine a time period during which sampling voltage Vsen is not greater than reference voltage Vref1. Voltage generation circuit 70 can include voltage-controlled current source S1, capacitor C3, diode D, and switch K. capacitor C3, diode D and switch K can connect in parallel between a first input terminal of comparator A3 and the ground. In this example, voltage-controlled current source S1 can be coupled between power supply voltage Vc and a first terminal of capacitor C3, and may be controlled by the output signal of comparator A2 to generate a current to charge capacitor C3. Switch K can be controlled by pulse signal Ts0 generated by single pulse generation circuit 50.

When the switching power supply is started, switch K can be controlled by pulse signal Ts0 to be turned on, such that voltage VC3 across capacitor C3 is reset to zero. After pulse signal Ts0 is inactive, switch K may be turned off. Then, during the period when sampling voltage Vsen is not greater than reference voltage Vref1, voltage-controlled current source S1 may generate the current to charge capacitor C3, and thus voltage VC3 across capacitor C3 can increase. Thus, voltage VC3 can represent a time period during which sampling voltage Vsen is not greater than reference voltage Vref1. A non-inverting input terminal of comparator A3 may receive voltage VC3, an inverting input terminal may receive voltage threshold Vref, and comparator A3 may generate intermediate signal Vmid by comparing voltage VC3 against voltage threshold Vref.

Intermediate signal Vmid may be active when voltage VC3 is greater than voltage threshold Vref. The logic circuit can generate detection signal Vtest according to intermediate signal Vmid and timing signal Ts1. In this example, the logic circuit can include single pulse generation circuit 71, AND-gate B1, and an RS flip-flop. When the timing time reaches the timing reference signal, single pulse generation circuit 71 may generate pulse signal Vp. AND-gate B1 may receive pulse signal Vp and intermediate signal Vmid, and can generate an active output signal when both pulse signal Vp and intermediate signal Vmid are active. Set terminal S of the RS flip-flop may receive the output signal of AND-gate B1, and reset terminal R may receive restart signal Vuvlo. The control chip can determine whether high-voltage pin HV is coupled to AC input voltage Vac or rectified voltage Vbus according to detection signal Vtest, and saves the detection result until the switching power supply is restarted.

Figure 8:
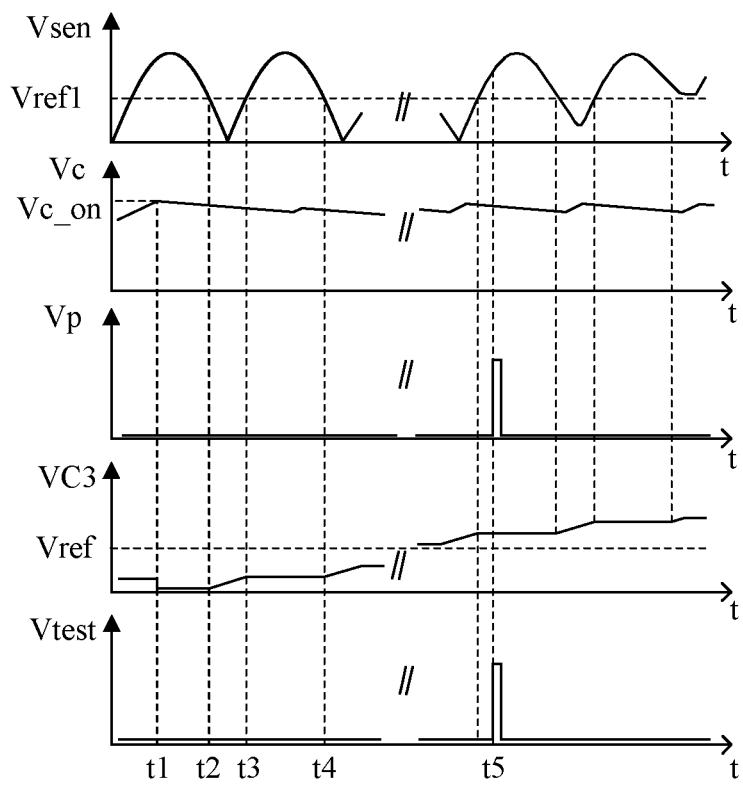
FIG. 8 is a waveform diagram of a third example control chip, in accordance with embodiments of the present invention.

Referring to FIG. 8, shown is a waveform diagram of the third example control chip, in accordance with embodiments of the present invention. In this particular example, at time t1, power supply voltage Vc is greater than power supply reference voltage Vc_on, which may indicate that the switching power supply is started. When the switching power supply is started, timing circuit 40 may start timing, and voltage VC3 across capacitor C3 can be reset. Also, the pull-down current generation circuit may provide a pull-down current to high voltage pin HV during the timing period. During time period t1-t2, sampling voltage Vsen can be greater than reference voltage Vref1, such that voltage-controlled current source S1 stops charging capacitor C3, and voltage VC3 across capacitor C3 remains unchanged. During time period t2-t3, sampling voltage Vsen may not be greater than reference voltage Vref1, and voltage-controlled current source S1 can charge capacitor C3, thus voltage VC3 across capacitor C3 may slowly increase.

During time period t3-t4, sampling voltage Vsen can be greater than reference voltage Vref1 again, thus voltage-controlled current source S1 may stop charging capacitor C3, and voltage VC3 across capacitor C3 may remain unchanged. The above process can be repeated until the timing period ends. At time t5, the timing time may reach the timing reference signal, timing circuit 40 may stop timing, and single pulse generation circuit 71 can generate pulse signal Vp. Also, the pull-down current generation circuit may stop supplying the pull-down current to high voltage pin HV. When voltage VC3 rises to be greater than voltage threshold Vref, the logic circuit can generate an active detection signal Vtest according to intermediate signal Vmid and pulse signal Vp. In this way, a determination can be made that high-voltage pin HV is coupled to AC input voltage Vac. In addition, discharge circuit 43 may receive detection signal Vtest and can discharge safety capacitor Cx when the switching power supply is powered off.

Figure 9:
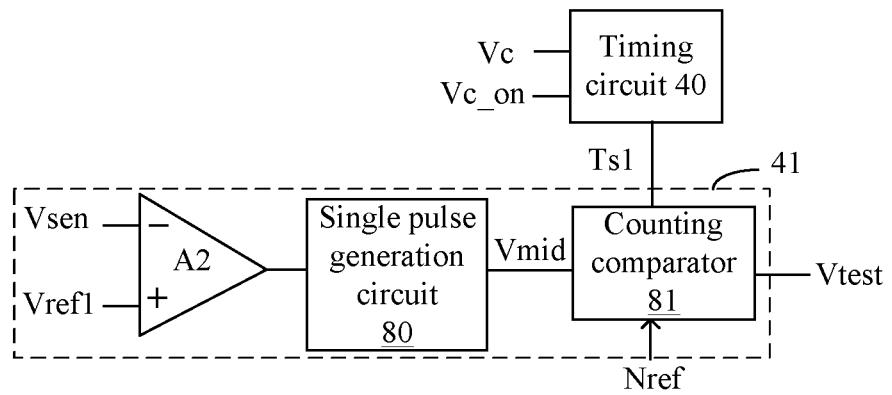
FIG. 9 is a schematic block diagram of a fourth example control chip, in accordance with embodiments of the present invention.

Referring now to FIG. 9, shown is a schematic block diagram of a fourth example control chip, in accordance with embodiments of the present invention. In this particular example, detection circuit 41 can detect the number of rising or falling edges of sampling voltage Vsen by comparing sampling voltage Vsen against reference voltage Vref1 to generate detection signal Vtest. For example, detection circuit 41 can include comparator A2, single pulse generation circuit 80, and counting comparator 81. In this example, the falling edges of sampling voltage Vsen are detected for example. An inverting input terminal of comparator A2 may receive sampling voltage Vsen that characterizes the input voltage on high voltage pin HV, and a non-inverting input terminal may receive reference voltage Vref1. Also, the falling edge of sampling voltage Vsen can be determined by comparing sampling voltage Vsen against reference voltage Vref1.

When sampling voltage Vsen drops below reference voltage Vref1, comparator A2 may generate a high level signal, and then single pulse generation circuit 80 may generate intermediate signal Vmid with a predetermined pulse width when receiving the high level signal generated by comparator A2. Counting comparator 81 may receive timing signal Ts1, and can count the number of intermediate signal Vmid during the timing period of the timing circuit. When the timing time reaches the timing reference signal, count comparator 81 can compare the count value against count reference value Nref to generate detection signal Vtest. The control chip may determine whether high-voltage pin HV is coupled to AC input voltage Vac or rectified voltage Vbus according to detection signal Vtest. It should be understood that the detection circuit can also detect the rising edge of sampling voltage Vsen by exchanging the input signals of the first and second input terminals, and other detection circuits that can realize the above functions may alternatively or additionally be utilized in certain embodiments.

Figure 10:
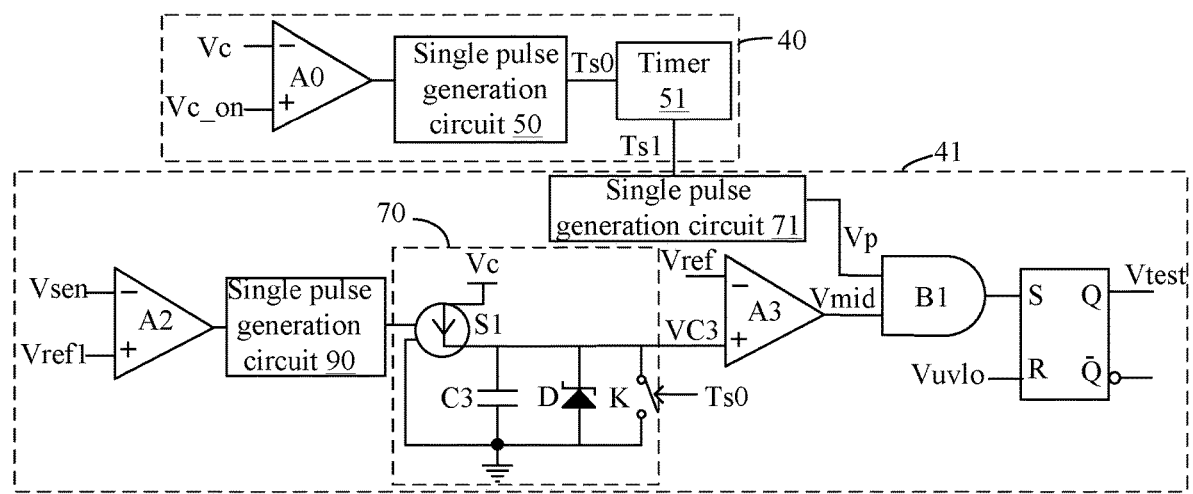
FIG. 10 is a schematic block diagram of a fifth example control chip, in accordance with embodiments of the present invention.

Referring now to FIG. 10, shown is a schematic block diagram of a fifth example control chip, in accordance with embodiments of the present invention. In this particular example, detection circuit 41 can also include single pulse generation circuit 90 coupled between comparator A2 and voltage generation circuit 70, and may detect rising or falling edges of sampling voltage Vsen to generate detection signal Vtest, such that the number of rising or falling edges of sampling voltage Vsen can be detected. In addition, detection circuit 41 may generate a current according to the rising or falling edges of sampling voltage Vsen to charge the capacitor, and can detection signal Vtest according to the voltage across the capacitor. In this example, detecting the falling edge of sampling voltage Vsen is taken as an example for description. Further, voltage generation circuit 70 and the logic circuit are substantially the same as the above-mentioned examples.

In this example, comparator A2 can detect the falling edge of sampling voltage Vsen by comparing sampling voltage Vsen against reference voltage Vref1. Single pulse generation circuit 90 may generate a pulse signal with a predetermined pulse width when receiving the high level signal generated by comparator A2. Voltage generation circuit 70 can charge capacitor C3 when receiving the pulse signal generated by single pulse generation circuit 90. Also, comparator A3 can generate intermediate signal Vmid by comparing voltage VC3 across capacitor C3 against voltage threshold Vref. When the timing time reaches the timing reference signal, the logic circuit may generate detection signal Vtest according to pulse signal Vp and intermediate signal Vmid. In this example, the control chip can determine whether high-voltage pin HV is coupled to AC input voltage Vac or rectified voltage Vbus according to detection signal Vtest. It should be understood that the detection circuit can detect the rising edge of sampling voltage Vsen by exchanging the input signals of the first and second input terminals, and other detection circuits that can realize the above functions may additionally or alternatively be utilized in certain embodiments.

Figure 11:
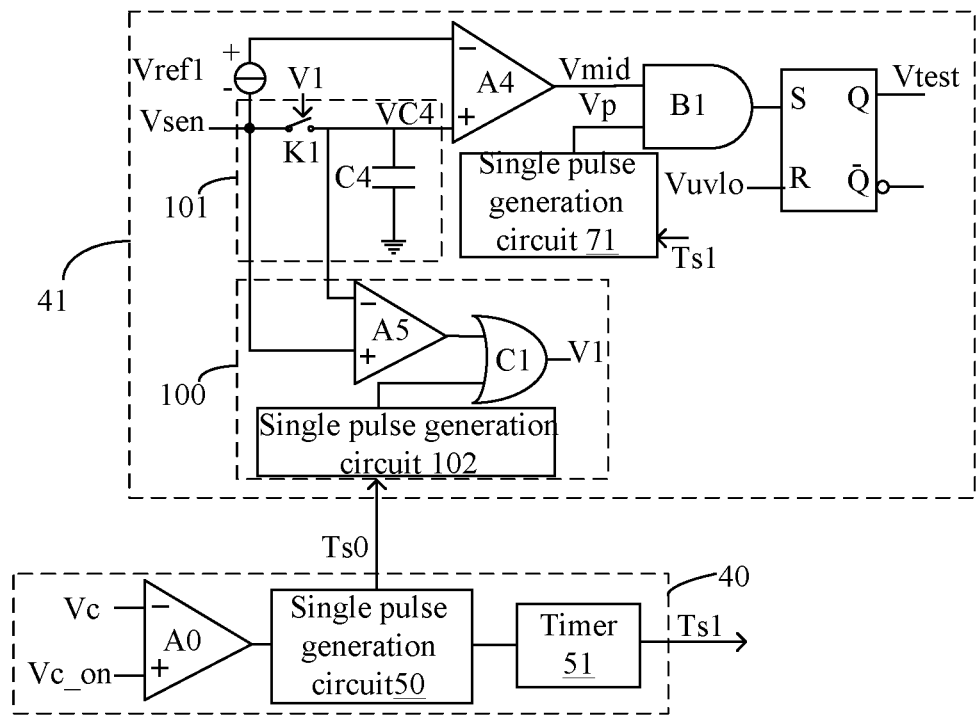
FIG. 11 is a schematic block diagram of a sixth example control chip, in accordance with embodiments of the present invention.

Referring now to FIG. 11, shown is a schematic block diagram of a sixth example control chip, in accordance with embodiments of the present invention. In this particular example, detection circuit 41 can detect the variation amplitude of sampling voltage Vsen in the detection period according to sampling voltage Vsen and reference voltage Vref1, to generate detection signal Vtest. Timing circuit 40 and the logic circuit are substantially the same as the above-mentioned examples. In this particular example, detection circuit 41 can include sampling control signal generation circuit 100, sample-and-hold circuit 101, comparator A4, and a logic circuit. For example, sampling control signal generation circuit 100 can include single pulse generation circuit 102, comparator A5, and OR-gate C1. Further, sampling control signal generation circuit 100 can generate an active sampling control signal V1 during the rising stage of sampling voltage Vsen, such that sample-and-hold circuit 101 may be controlled to sample and hold a peak value of sampling voltage Vsen.

Single pulse generation circuit 102 may receive pulse signal Ts0 generated by timing circuit 40, and can generate a pulse signal with a predetermined pulse width when power supply voltage Vc reaches power supply reference voltage Vc_on. A non-inverting input terminal of comparator A5 may receive sampling voltage Vsen, and an inverting input terminal may receive holding voltage VC4 representing the peak value of sampling voltage Vsen. OR-gate C1 may receive the output signal of comparator A5, and the output signal of single pulse generation circuit 102. When at least one of the output signals of comparator A5 and single pulse generation circuit 102 is active, OR-gate C1 may activate sampling control signal V1. Further, sample-and-hold circuit 101 can include switch K1 and capacitor C4 connected in series.

When sampling control signal V1 is active, switch K1 can be turned on, and sampling voltage Vsen may be sampled and held through capacitor C4. During the rising stage of sampling voltage Vsen, sampling voltage Vsen can always be higher than holding voltage VC4 on capacitor C4, and capacitor C4 can be charged and finally holding voltage VC4 equal to the peak value of sampling voltage Vsen. A non-inverting input terminal of comparator A4 may receive holding voltage VC4, and an inverting input terminal may receive the sum of sampling voltage Vsen and reference voltage Vref1 to generate an intermediate signal Vmid.

During the falling stage of sampling voltage Vsen, sampling voltage Vsen may always be lower than holding voltage VC4, and sampling control signal V1 can be inactive, such that switch K1 is turned off, and holding voltage VC4 is maintained at the peak value of sampling voltage Vsen. When the timing time reaches the timing reference signal, the logic circuit may generate detection signal Vtest according to pulse signal Vp and intermediate signal Vmid generated by comparator A4. Therefore, the control chip can determine whether high-voltage pin HV is coupled to AC input voltage Vac or rectified voltage Vbus according to detection signal Vtest. It should be understood that the detection signal is generated by detecting the falling amplitude of sampling voltage Vsen in this example, and it can also be achieved by detecting the rising amplitude of sampling voltage Vsen by adaptively adjusting the foregoing circuit structures. Also, other circuits that can achieve the above functions can additionally or alternatively be utilized in certain embodiments.

For example, when the amplitude of sampling voltage Vsen falling from the peak value exceeds reference voltage Vref1, the logic circuit can generate an active detection signal Vtest, such that high-voltage pin HV is determined to be coupled to AC input voltage Vac. Further, discharge circuit 43 may receive detection signal Vtest and discharge safety capacitor Cx when the switching power supply is powered off. If the amplitude of sampling voltage Vsen falling from the peak value does not exceed reference voltage Vref1, and the logic circuit generates an inactive detection signal Vtest, high-voltage pin HV may be determined to be coupled to rectified voltage Vbus. Thus, discharge circuit 43 can be prohibited from discharging safety capacitor Cx.

Figure 12:
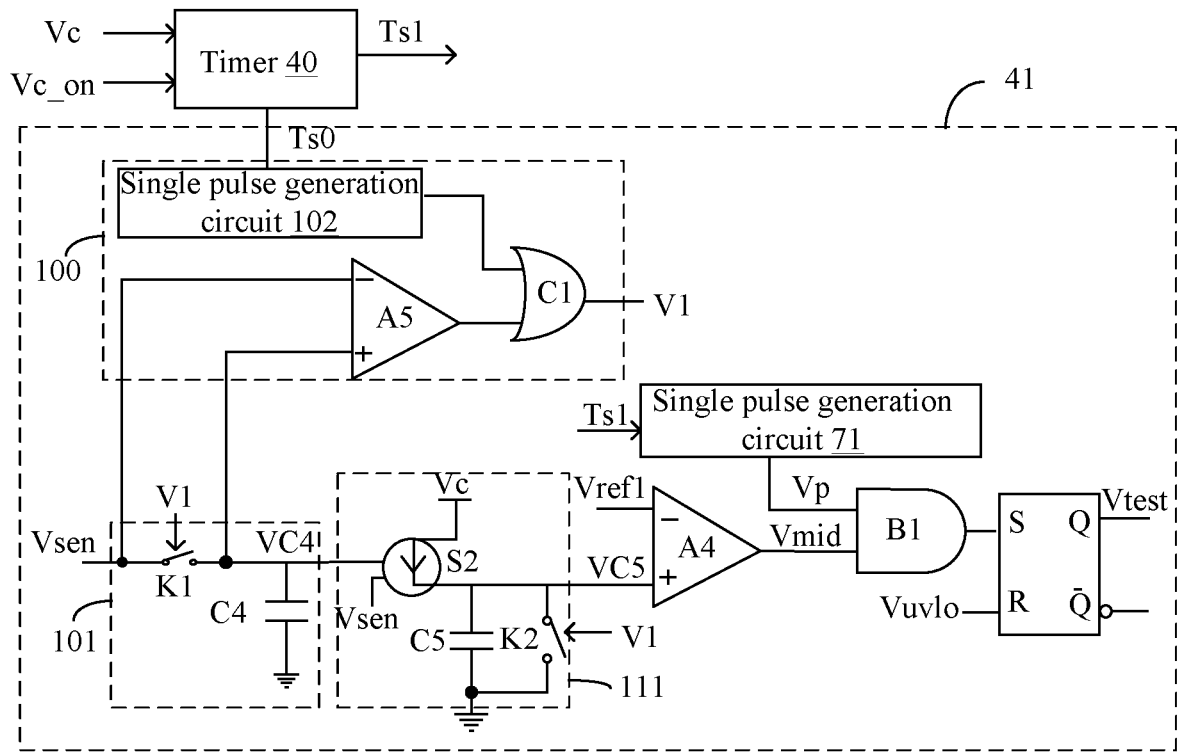
FIG. 12 is a schematic block diagram of a seventh example control chip, in accordance with embodiments of the present invention.

Referring now to FIG. 12, shown is a schematic block diagram of a seventh example control chip, in accordance with embodiments of the present invention. In this particular example, detection circuit 41 may integrate the falling amplitude of sampling voltage Vsen in the detection period to generate an integration voltage, and can generate a detection signal according to the integrated voltage. For example, detection circuit 41 can include sampling control signal generation circuit 100, sample-and-hold circuit 101, integration circuit 111, comparator A4, and a logic circuit. In this example, sampling control signal generation circuit 100, sample-and-hold circuit 101, and the logic circuit may be substantially the same as in the sixth example discussed above.

For example, integration circuit 111 can include voltage-controlled current source S2, capacitor C5 and switch K2. Capacitor C5 and switch K2 can connect in parallel between a first input terminal of comparator A4 and the ground. In this example, voltage-controlled current source S2 can be coupled between power supply voltage Vc and a first terminal of capacitor C5, and may be controlled by a difference between sampling voltage Vsen and holding voltage VC4 (e.g., a first control terminal of voltage-controlled current source S2 may receive holding voltage VC4, and a second control terminal may receive sampling voltage Vsen) to generate a current to charge capacitor C5. Switch K2 can be controlled by sampling control signal V1, and voltage VC5 across capacitor C5 may be reset to zero when switch K2 is turned on during the rising stage of sampling voltage Vsen. Further, during the rising stage of sampling voltage Vsen, sampling voltage Vsen can be sampled and held by sample-and-hold circuit 101 to generate holding voltage VC4. Also, sampling voltage Vsen can be substantially equal to holding voltage VC4, so capacitor C5 can essentially not be charged by voltage-controlled current source S2.

When sampling voltage Vsen is falling, holding voltage VC4 can be equal to the peak value of sampling voltage Vsen, and thus voltage-controlled current source S2 may generate a current according to the difference between sampling voltage Vsen and holding voltage VC4 to charge capacitor C5. Therefore, integration voltage VC5 can be generated on capacitor C5, which may represent the amplitude of sampling voltage Vsen falling from the peak value. Also, a non-inverting input terminal of comparator A4 may receive integral voltage VC5, and an inverting input terminal may receive reference voltage Vref1. Comparator A4 can generate intermediate signal Vmid by comparing reference voltage Vref1 against integration voltage VC5, in order to determine the amplitude of sampling voltage Vsen falling from the peak value. When the timing time reaches the timing reference signal, the logic circuit may generate detection signal Vtest according to pulse signal Vp and intermediate signal Vmid. After that, the control chip can determine whether high-voltage pin HV is coupled to AC input voltage Vac or rectified voltage Vbus according to detection signal Vtest.

Figure 13:
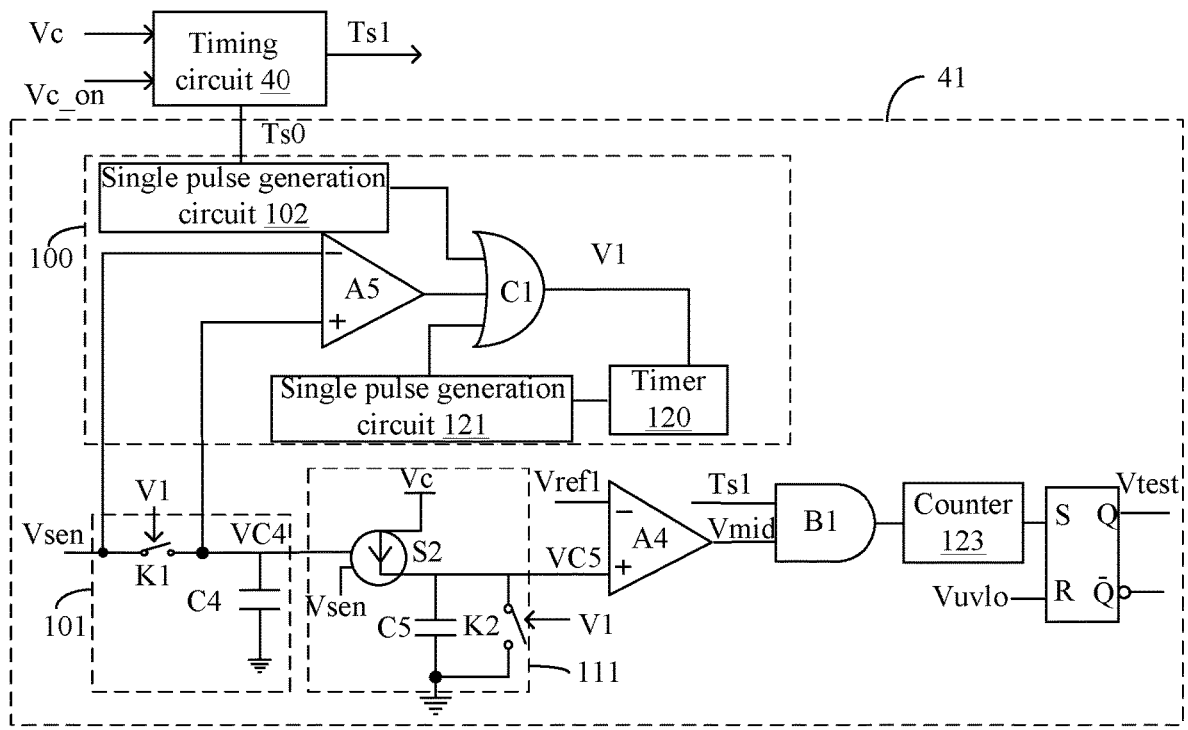
FIG. 13 is a schematic block diagram of an eighth example control chip, in accordance with embodiments of the present invention.

Referring now to FIG. 13, shown is a schematic block diagram of an eighth example control chip, in accordance with embodiments of the present invention. In this particular example, detection circuit 41 may divide the detection period into N detection intervals, and can detect the connection way of high-voltage pin HV once in each detection interval to generate a determination result. When the times of the determination result is accumulated to a preset number of times, the detection signal may be generated, thereby improving the detection accuracy. In this example, detection circuit 41 can include sampling control signal generation circuit 100, sample-and-hold circuit 101, integration circuit 111, comparator A4, and a logic circuit. Here, integration circuit 111 and sample-and-hold circuit 101 can be substantially the same as those in the seventh example. In this example, sampling control signal generation circuit 100 can include single pulse generation circuit 102, comparator A5 and OR-gate C1.

When the switching power supply is started or sampling voltage Vsen is rising, OR-gate C1 may generate an active sampling control signal V1. In order to control the detection circuit to repeatedly detect sampling voltage Vsen during the detection period, sampling control signal generation circuit 100 can also include timer 120 and single pulse generation circuit 121. Timer 120 can be reset every preset time to generate an active sampling control signal V1. Then, switch K2 can be controlled by active sampling control signal V1 to be turned on to reset integration voltage VC5 on capacitor C5 to zero every preset time, such that comparator A4 can constantly compare reference voltage Vref1 and the current integration voltage to update intermediate signal Vmid. The logic circuit can include AND-gate B1, counter 123, and RS flip-flop.

During the active period of timing signal Ts1, that is, during the detection period, AND-gate B1 may generate an output signal according to intermediate signal Vmid. Counter 123 can count the determination result according to the output signal of AND-gate B1, and may generate a set signal when the times of the determination result is accumulated to a preset number of times. The RS flip-flop can generate detection signal Vtest according to the set signal and the restart signal, in order to realize multiple detections on the connection way of the high-voltage pin in the detection period, thereby improving the detection accuracy. In this example, the preset time can be set according to the particular application environment.

As described above, it can be seen that only one control chip is provided in certain embodiments of the present invention. According to the input voltage on the high-voltage pin and the first reference voltage, it can be determined whether the high-voltage pin is coupled to the AC input voltage or the rectified voltage, in order to adaptively adjust the function of discharging the safety capacitor. In this way, the control chip can be compatible with multiple connection ways at the same time, thereby saving the number of control chips, reducing management costs, and facilitating system integration. When the detection signal is inactive, the control chip may be prohibited from discharging the safety capacitor. When the detection signal is active, the control chip can discharge the safety capacitor when the switching power supply is powered off, thereby reducing the power consumption of the switching power supply.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control chip applied in a switching power supply, wherein the switching power supply comprises a rectifier circuit for receiving an AC input voltage and generating a rectified voltage, the control chip comprising:
   a) a high-voltage pin;
   b) a detection circuit coupled to the high-voltage pin to determine whether the high-voltage pin is coupled to the AC input voltage or the rectified voltage according to a sampling voltage representing a voltage received by the high-voltage pin during a detection period by detecting one of: a time period during which the sampling voltage is not greater than a first reference voltage, a number of rising or falling edges of the sampling signal, and a variation amplitude of the sampling voltage; and
   c) a discharge circuit, wherein when the high-voltage pin is determined to be coupled to the AC input voltage, the control chip is configured to enable the discharge circuit to discharge a safety capacitor coupled to an input port of the switching power supply after the switching power supply is powered off, and when the high-voltage pin is determined to be coupled to the rectified voltage, the control chip is configured to disable the discharge circuit, wherein the discharge circuit does not discharge the safety capacitor during the detection period.

2. The control chip of claim 1, further comprising an error correction circuit configured to compare the sampling voltage with a reference voltage after the safety capacitor is discharged by the discharge circuit for a preset time, and the control chip is configured to disable the discharge circuit when the sampling voltage is greater than the voltage reference.

3. The control chip of claim 1, being configured to provide a charging current to the power pin according to the input voltage on the high-voltage pin, in order to generate a power supply voltage on the power pin, such that the control chip is powered up.

4. The control chip of claim 1, wherein the detection period is a predetermined time period comprising at least half of a power frequency period.

5. The control chip of claim 1, wherein after the control chip is powered up, the control chip is configured to determine whether the high-voltage pin is coupled to the AC input voltage or the rectified voltage, and to generate a detection signal.

6. The control chip of claim 5, wherein the detection period is a predetermined time period from a start-up moment of the switching power supply, and the predetermined time period comprises at least half period of the AC input voltage.

7. The control chip of claim 6, further comprising a timing circuit configured to time from the start-up moment of the switching power supply and generate a timing signal that represents the detection period, wherein the start-up moment of the switching power supply is a moment when a power supply voltage on a power supply pin of the control chip is greater than a power supply reference voltage.

8. The control chip of claim 7, wherein:
   a) the detection circuit is configured to generate an intermediate signal according to the sampling voltage and the first reference voltage during the detection period, and generate the detection signal according to the intermediate signal and the timing signal;
   b) when the intermediate signal is active after the detection period ends, the high-voltage pin is determined to be coupled to the AC input voltage; and
   c) when the intermediate signal is inactive, the high-voltage pin is determined to be coupled to the rectified voltage.

9. The control chip of claim 8, wherein the detection circuit comprises:
   a) a first comparison circuit configured to compare the sampling voltage against the first reference voltage to generate a first comparison signal;
   b) a voltage generation circuit configured to generate a charging current according to the first comparison signal to charge a capacitor; and
   c) a second comparison circuit configured to compare a voltage across the capacitor against a voltage threshold to generate the intermediate signal.

10. The control chip of claim 8, wherein the detection circuit comprises:
    a) a first comparison circuit configured to compare the sampling voltage against the first reference voltage to generate a first comparison signal;
    b) a single phase generation circuit configured to detect rising or falling edges of the sampling signal according to the first comparison signal to generate a pulse signal;
    c) a voltage generation circuit configured to generate a charging current according to the pulse signal to charge a capacitor; and
    d) a second comparison circuit configured to compare a voltage across the capacitor against a voltage threshold to generate the intermediate signal.

11. The control chip of claim 8, wherein the detection circuit comprises:
    a) a first comparison circuit configured to compare the sampling voltage against the first reference voltage to generate a first comparison signal;
    b) a single phase generation circuit configured to detect rising or falling edges of the sampling signal according to the first comparison signal to generate the intermediate signal; and
    c) a counting comparison circuit configured to count the intermediate signal when the timing signal is active, and to compare a counting value against a counting reference value to generate the detection signal.

12. The control chip of claim 8, wherein the detection circuit comprises:
    a) a sample-and-hold circuit configured to sample and hold a peak value of the sampling voltage to generate a holding voltage; and
    b) a first comparison circuit having a first input terminal for receiving the holding voltage, a second input terminal for receiving a sum of the first reference voltage and the sampling voltage, and an output terminal for generating the intermediate signal.

13. The control chip of claim 8, wherein the detection circuit comprises:
    a) a sample-and-hold circuit configured to sample and hold a peak value of the sampling voltage to generate a holding voltage;

b) an integration circuit configured to generate an integration current according to a difference between the holding voltage and the sampling voltage to charge a capacitor to generate an integration voltage; and
c) a first comparison circuit configured to compare the integration voltage against the first reference voltage to generate the intermediate signal.

14. The control chip of claim 8, wherein the detection circuit comprises a logic circuit configured to generate the detection signal according to the intermediate signal and a restart signal for the switching power supply when the timing signal reaches a timing reference signal.

15. The control chip of claim 5, wherein:
a) the control chip is configured to detect a time period during which the sampling voltage is not greater than the first reference voltage in the detection period;
b) when the time period is greater than a first threshold, the high-voltage pin is determined to be coupled to the AC input voltage; and
c) when the time period is not greater than the first threshold, the high-voltage pin is determined to be coupled to the rectified voltage.

16. The control chip of claim 5, wherein:
a) the control chip is configured to detect the number of rising or falling edges of the sampling voltage by comparing the sampling voltage with the first reference voltage in the detection period;
b) when the number of the rising or falling edges of the sampling voltage reaches a counting reference, the high-voltage pin is determined to be coupled to the AC input voltage; and
c) when the number of the rising or falling edges of the sampling voltage is less than the counting reference, the high-voltage pin is determined to be coupled to the rectified voltage.

17. The control chip of claim 5, wherein:
a) when the rising or falling amplitude of the sampling voltage is greater than the first reference voltage, the high-voltage pin is determined to be coupled to the AC input voltage; and
b) when the rising or falling amplitude of the sampling voltage is less than the first reference voltage, the high-voltage pin is determined to be coupled to the rectified voltage.

18. The control chip of claim 5, wherein after the detection period ends, a new detection period is automatically started, such that the control chip is configured to repeatedly detect whether the high voltage pin is coupled to the AC input voltage or the rectified voltage.

19. The control chip of claim 5, wherein:
a) the detection period is divided into N detection intervals, wherein N is a positive integer;
b) the control chip is configured to determine whether the high voltage pin is coupled to the AC input voltage or the rectified voltage in each detection interval to generate a determination result; and
c) when the times of the determination result is accumulated to a preset number of times, the detection signal is generated.

20. The control chip of claim 5, further comprising a pull-down current generation circuit configured to provide a pull-down current to the high-voltage pin during the detection period to avoid interference to the input voltage received by the high-voltage pin.

* * * * *